United States Patent [19]

Rineer

[11] 4,133,189
[45] Jan. 9, 1979

[54] CONSTANT-VELOCITY UNIVERSAL JOINT

[76] Inventor: Arthur E. Rineer, P.O. Box 115, Beulah, Mich. 49617

[21] Appl. No.: 798,260

[22] Filed: May 18, 1977

[51] Int. Cl.² .............................................. F16D 3/30
[52] U.S. Cl. ...................................... 64/17 R; 64/21
[58] Field of Search ............... 64/21, 9 A, 17 A, 17 R

[56] References Cited

U.S. PATENT DOCUMENTS

| 1,450,805 | 4/1923 | Hart-Spratt | 64/9 A |
| 2,033,733 | 3/1936 | Myard | 64/9 A |
| 2,051,248 | 8/1936 | Dunn | 64/21 |
| 2,377,408 | 6/1945 | Dunn | 64/21 |
| 2,377,451 | 6/1945 | Ransom | 64/21 |
| 2,453,279 | 11/1948 | Starbuck | 64/9 A |
| 2,509,969 | 5/1950 | Dunn | 64/21 |
| 2,584,648 | 2/1952 | Welsh | 64/21 |
| 2,662,381 | 12/1953 | Wildhaber | 64/21 |
| 2,802,352 | 8/1957 | Anderson | 64/21 |
| 2,923,141 | 2/1960 | Simonds | 64/21 |
| 3,357,210 | 12/1967 | Dean | 64/21 |
| 3,792,598 | 2/1974 | Orain | 64/21 |
| 3,961,497 | 6/1976 | Cohen | 64/21 |

FOREIGN PATENT DOCUMENTS 84991  4/1957  Netherlands ........................ 64/9 A Primary Examiner—Samuel Scott
Assistant Examiner—R. C. Turner
Attorney, Agent, or Firm—Glenn B. Morse

[57] ABSTRACT

Driving and driven shafts are respectively associated with inner and outer hollow spherical members in either relationship. The spherical members have a plurality of channels in planes preferably parallel to the axes of the respective shafts. A transfer assembly within the inner spherical member includes a group of radially-extending arms or rollers, each traversing a channel in both the inner and outer spherical members. These radially-extending arms or rollers have a freedom of angular articulation with respect to each other where they are not on a diametrically opposite relationship.

4 Claims, 14 Drawing Figures

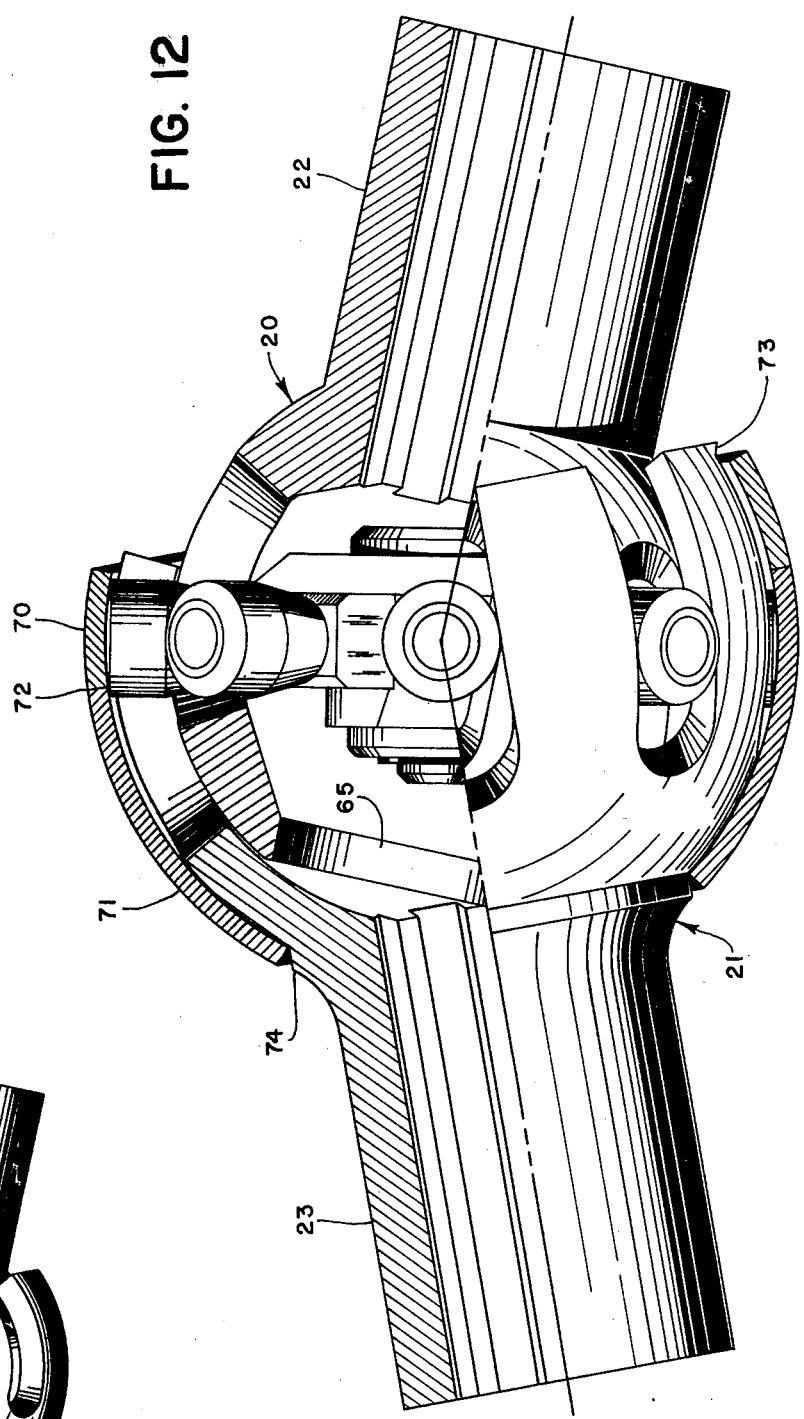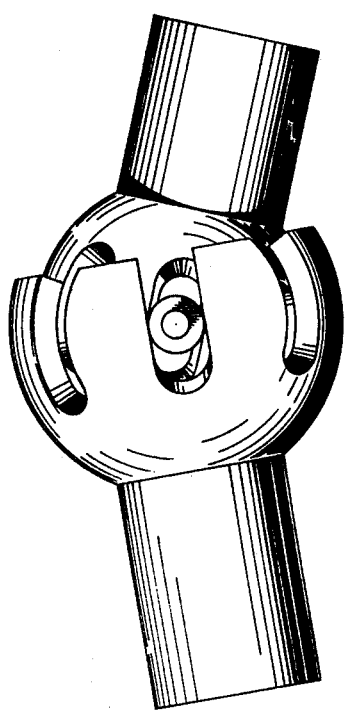

CONSTANT-VELOCITY UNIVERSAL JOINT

BACKGROUND OF THE INVENTION

Wherever it is necessary to transfer torque between shafts where the axes of the shafts intersect, but are not coaxial, it is common practice to use a device referred to as a "universal joint." Where only a slight angle of displacement between the two shafts is involved, it is possible to use relatively simple devices with either a lost-motion connection, or which accommodate the articulation with resilient members. With larger angles of shaft displacement, however, a more sophisticated system becomes necessary. A typical and very common application of this type of mechanism occurs at the points of transfer of torque at the opposite ends of the automobile drive shaft, where one end is driven by the output shaft of the transmission, and the opposite end delivers power to the differential assembly. The vertical movement of the axes of the rear wheels with respect to the frame results in a varying relationship between the points of torque transfer, and requires the installation of universal joints to accommodate this motion.

The most common form of universal joint capable of substantial angular deviation between the driving and driven shafts is the so-called "Cardan joint." Essentially, this device consists of a cross-shaped member, with one set of diametrically-opposite points being pivotally connected to the opposite ends of a fork secured to a driving shaft, and the other diametrically-opposite points received by a similar fork secured to a driven shaft. The points of pivotal interconnection between the forks and the cross member are usually provided with needle bearings to accommodate the articulation and the relatively high forces transferred at these points. The problem with the Cardan joint, however, is that the rotation of the driven shaft does not precisely follow the rotation of the driving shaft. Because of the geometry involved, there is a continuing angular oscillation of the one shaft with respect to the other, the amount of which is related to the deviation angle between the driving and driven shafts. At low speeds, this usually presents very little problem; but at high speeds, these torsional variations produce oscillations that generate objectionable vibration. Much attention has been devoted to the design of a universal joint that would not display these variations between the rotation of the driving and driven shafts. This type of joint has been designated as a "constant-velocity" universal joint, and a number of these devices have been worked out with limited success. One form of such a unit involves inner and outer spherical members with opposite channels arranged in planes generally parallel to the axes of the shafts, with these channels formed on the inner surface of the outer spherical member, and vice versa, so that the two sets of channels form passages which entrap a set of balls responsible for the transfer of forces between the inner and outer members. Some sort of positioning cage interposed between the spherical members is usually necessary to locate the balls so that their centers fall on a common plane, which usually is the plane perpendicular to the plane of the shaft axes, and bisecting the angle between the driving and driven shafts. This plane is conveniently referred to as the "bisector plane." The need for a locating cage for the force-transfer balls necessarily results in a substantial radial distance between the points at which forces are applied to the balls by the inner and outer spherical members. The greater this distance, the more intense are the bearing forces at these points of contact, which results from the angular relationship of the force vectors. If the points of force transfer could be maintained at positions where the force vectors were all tangential, the local bearing forces would be brought to a minimum. This desirable situation is not associated with any previous constant velocity joint I am aware of.

SUMMARY OF THE INVENTION

Inner and outer hollow spherical members are respectively secured to driving and driven shafts. The inner spherical member is slightly less in outside diameter than the inside diameter of outer spherical member, resulting in a substantially concentric relationship between these members. The inner member is received into the outer member through an opening in the outer member. Aligned channels in the inner and outer members are arranged generally parallel to the axes of the respective shafts, this "alignment" existing primarily in a peripheral sense when the input and output shafts are coaxial. Under conditions in which the axes deviate into an angular relationship other than coaxial, the channels overlie in intersecting planes defining radially-projected spaces. Torque is transferred from one spherical member to the other by radially-extending components of a transfer assembly that traverse the spaces defined by the overlapping channels of the spherical members. The transfer members thus are primarily in shear relationship, having a function similar to the crosspins customarily used in rotatably fixing a collar with respect to a shaft. This analogy is incomplete, however, as a very complex relationship takes place between the transfer assembly and the inner and outer spherical members as the assembly rotates under any non-coaxial relationship between the driving and driven shafts. The transfer assembly preferably includes a plurality of diametral units having a small degree of angular articulation with respect to each other in a plane bisecting the angle between the axes of the driving and driven shafts. Arrangements are provided for maintaining the position of the transfer assembly in a plane perpendicular to the shaft axes when they are in a coaxial relationship.

DESCRIPTION OF THE DRAWINGS

FIG. 11 is a view of the inner and outer spherical members in a deflected condition, showing one of the components of the transfer assembly in engagement with overlapping channels in the spherical members.

FIG. 12 is a view of the complete universal assembly in a deflected condition, showing a modified form of FIG. 13 is a view similar to FIG. 1, but showing a modification incorporating an arrangement for maintaining the planar position of the transfer assembly.

DESCRIPTION OF THE PREFERRED EMBODIMENTS

Figure 1:
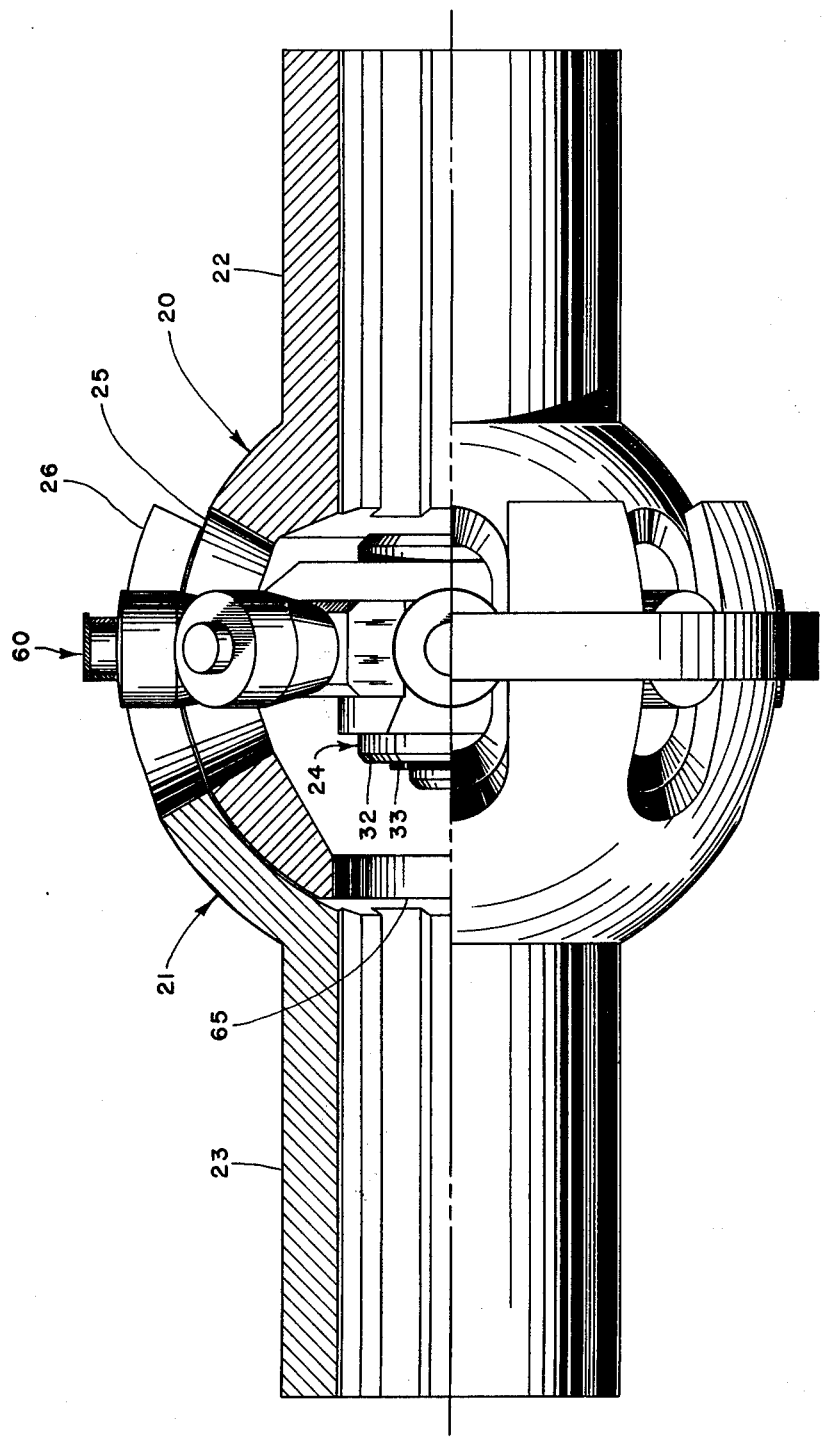
FIG. 1 is a side elevation, partially in section, of a complete universal joint embodying the present invention.
Figure 3:
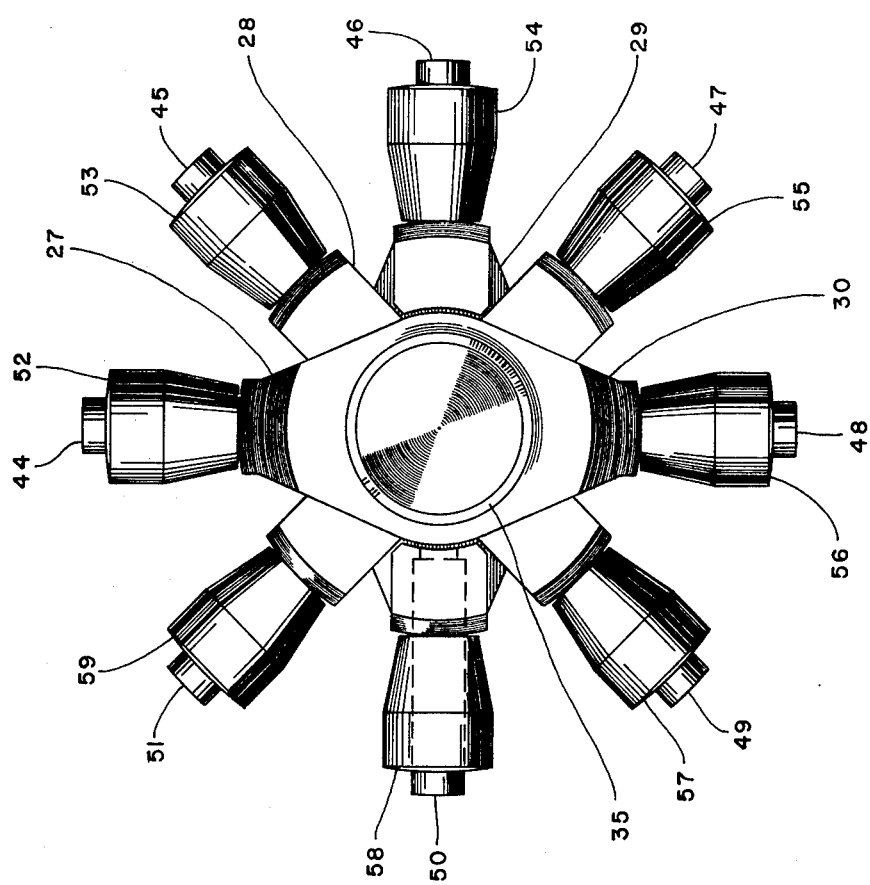
FIG. 3 is an end view of a transfer assembly incorporated in the FIG. 1 mechanism.
Figure 2:
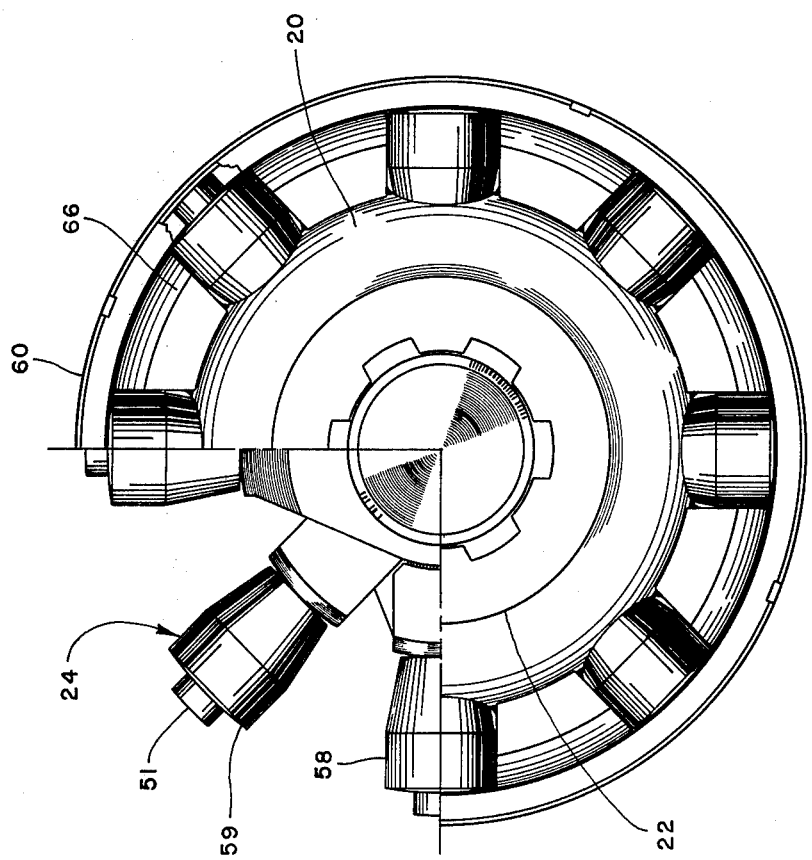
FIG. 2 is a right end view with respect to FIG. 1.
Figure 7:
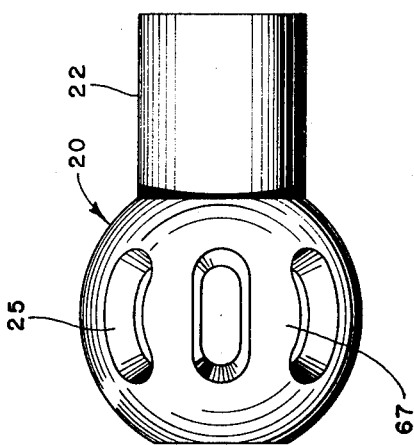
FIG. 7 is a side elevation of the inner spherical member.
Figure 6:
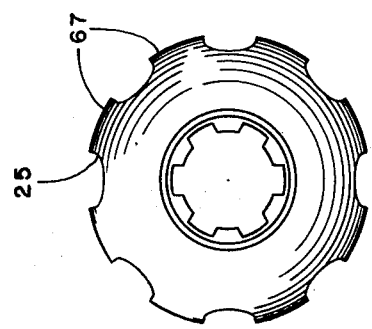
FIG. 6 is an end view of the inner spherical member.
Figure 5:
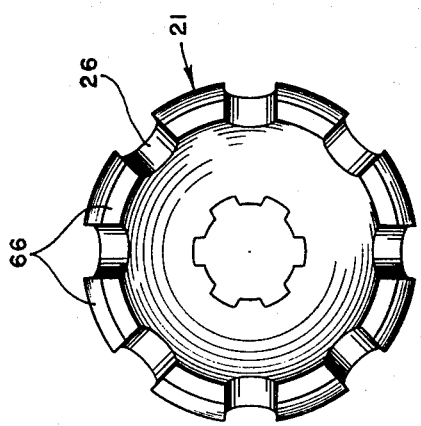
FIG. 5 is an end view with respect to FIG. 4.
Figure 4:
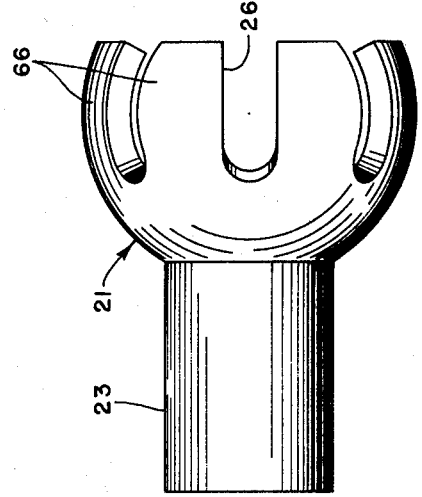
FIG. 4 is a side elevation of the outer spherical member.
Figure 9:
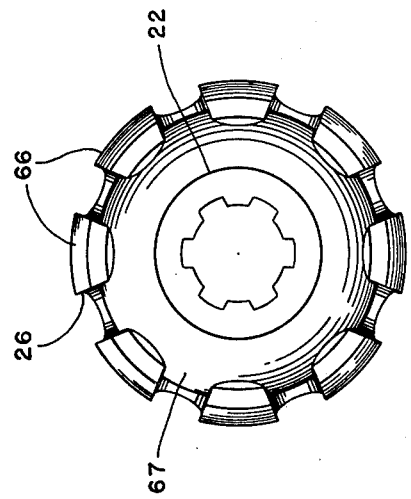
FIG. 9 is an end view with respect to FIG. 8.
Figure 10:
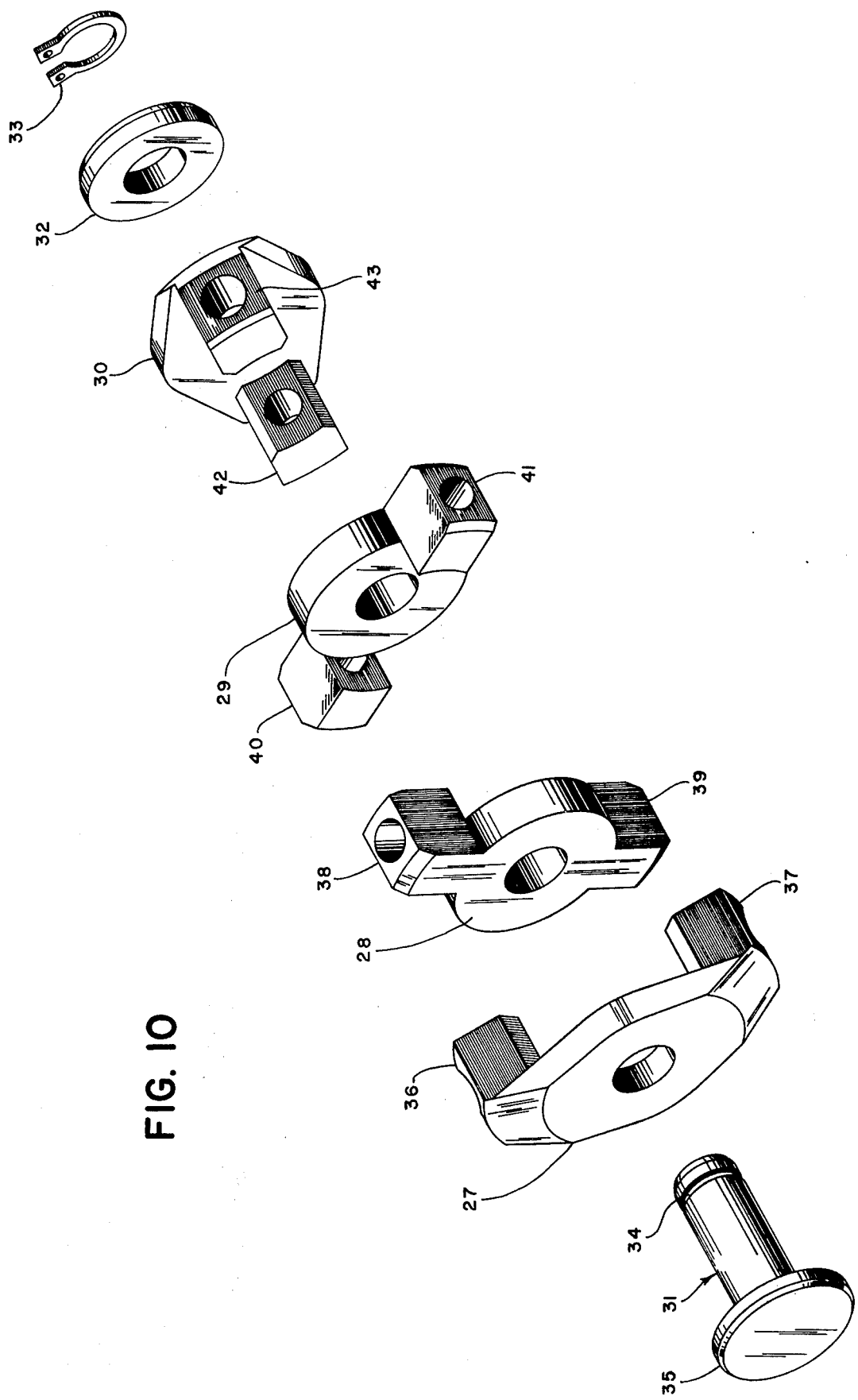
FIG. 10 is an exploded view of the components of the transfer assembly.

Referring particularly to FIG. 1, the inner and outer spherical members 20 and 21 each have a collar extension indicated at 22 and 23, respectively, providing spline connections for interengagement with driving and driven shafts. It is unimportant which of these is considered as the "driving" shaft. The spherical members are hollow, with the space inside the inner spherical member 20 accommodating the central portion of the transfer assembly 24. Torque applied through the spline collar 22 proceeds through the spherical member 20, producing forces at the walls of the channels 25 which are transferred to the walls of the channels 26 as a result of the presence of the radially-extending components of the transfer assembly 24. This assembly is shown best in FIGS. 3 and 10. The diametral members 27–30 have their central portions in overlapping coaxial relationship, and are pivotally interconnected by the pin 31, and secured axially by the presence of the ring 32 held in position by the snap ring 33 engaging the groove 34 in the pin so that the diametral members are thus confined between the ring 32 and the head 35 of the pin. The configuration of the central portions of the diametral members is such that a slight degree of angular articulation is possible, the amount of which is related to the degree of angular displacement between the driving and driven shafts which the particular assembly is designed to accommodate.

Figure 14:
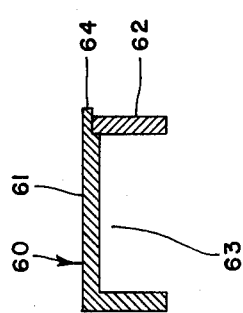
FIG. 14 is a section on an enlarged scale showing the construction of the peripheral retaining ring.

Each of the diametral members is provided with lugs as shown at 36–43 having radial holes for receiving the shafts 44–51, respectively in a press fit. The rollers 52–59 are rotatably received on these shafts, and are confined against radially outward movement by the presence of the retaining ring assembly 60, shown in detail in FIG. 14. This assembly includes a primary ring 61 and a closure ring 62 defining an annular space indicated at 63 which is slightly greater in axial length than the diameter of the roller shafts. The components 61 and 62 are assembled from axially opposite directions, followed by applying a staking operation at the shelf 64 to deflect some of the metal at this point radially inward to secure the ring 62 in position. The primary ring component 61 thus functions to hold the shafts radially inward, and also prevent outward migration of the rollers under the action of the forces involved in the operation of the differential assembly.

Figure 8:
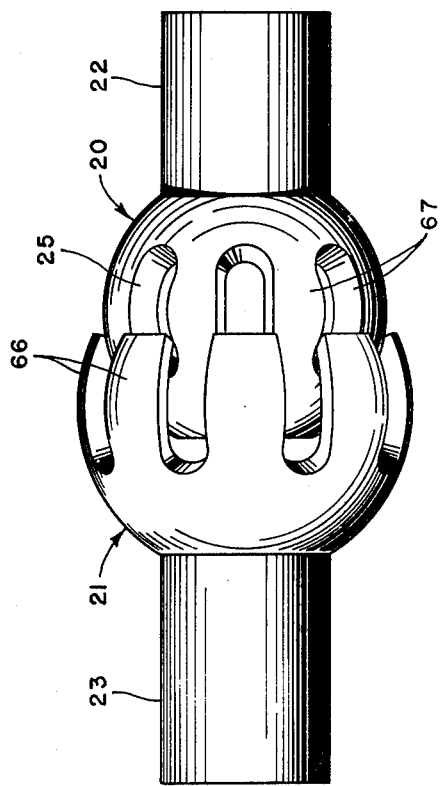
FIG. 8 is a view illustrating the procedure in assembling the inner and outer spherical members

The assembly of the components of the universal joint must be a carefully-planned procedure. This is preferably initiated by inserting the pin 31 headfirst through the opening 65 in the end of the inner spherical member, and then progressively assemblying the diametral members to the pin in sequence, followed by the installation of the rings 32 and 33. The inner and outer spherical members are then assembled axially as shown in FIG. 8, with the finger-shaped portions 66 (providing the walls of the open-ended channels 26) in axially-opposite relationship with the channels 25 of the inner spherical member. Only in this angular relationship of the inner and outer spherical members can the axial movement take place which results in concentric relationship of the spherical members. Once fully interengaged, the inner and outer spherical members can be relatively rotated so that the channels 25 and 26 are radially opposite. In this position, the shafts 44–51 can be inserted radially from the outside, followed by the addition of the rollers 52–59, and then the ring components 61 and 62. The rollers, incidentally, may either be of one piece, or divided into two pieces so that one of these bears on the walls of the channels 25, and the other on the walls of the channels 26. The portions in engagement with the channels 25 (on the inner spherical member) are preferably conical in configuration to accommodate the relatively inclined walls of the channels 25 in a relationship that gives a greater strength to the portions 67 between these channels. The ends of the fingers 66 define an end opening slightly smaller than the outside diameter of the inner spherical member, as the fingers embrace more than half of the spherical surface defining the inner member.

The functioning of the device during rotation under conditions in which the axes of the driving and driven shafts are deflected is very striking. Referring to FIG. 11, the intersecting overlapping relationship of the inner and outer channels obviously confines the rollers of the transfer assembly inherently in a position in which the axes of the roller shafts are in a plane bisecting the angle between the driving and driven shafts. An analysis of the transfer of forces as the complete unit rotates establishes that any major transfer of force from the inner spherical member to the outer spherical member through the rollers at positions where the channels are in intersecting relationship as shown in FIG. 11 would produce a strong tendency to move the roller laterally out of the bisector plane in one direction or the other, depending upon the direction of the application of torque. This action would be similar to applying a squeezing action with the fingers at the edges of a wet bar of soap, and would tend to generate substantial stresses in the diametral members, if such forces in fact existed. Such movement would be accompanied by slight relative rotation of the spherical members. At the point where the rollers pass through the plane of the intersecting axes of the driving and driven shafts, however, the inner and outer channels are in parallel relationship, thus completely blocking any relative rotation between the inner and outer spherical members, and thus eliminating any possibility of generating substantial transfer forces in the diametral members at any other position. The placement of the rollers in the spaces defined by the overlapping intersecting channels at other positions, however, has the inherent function of orienting the transfer assembly positively on the bisector plane. There are substantial advantages resulting from this, one of these being that the torque transfer forces between the rollers and the walls of the channels take place under conditions in which there is substantially no rolling action, thus guaranteeing a relative freedom from wear. Each roller, as it passes through the plane of the deflected driving and driven shafts, thus picks up half of the load involved in the torque transfer in a gradual manner, and then is released from such load as the succeeding roller comes into action. This occurs at both the inside and outside of the angle formed by the shaft axes. This analysis may be modified by accumulations of tolerance, friction, and deflection characteristics to the point that minor load transfer may take place at other positions.

Figure 13:
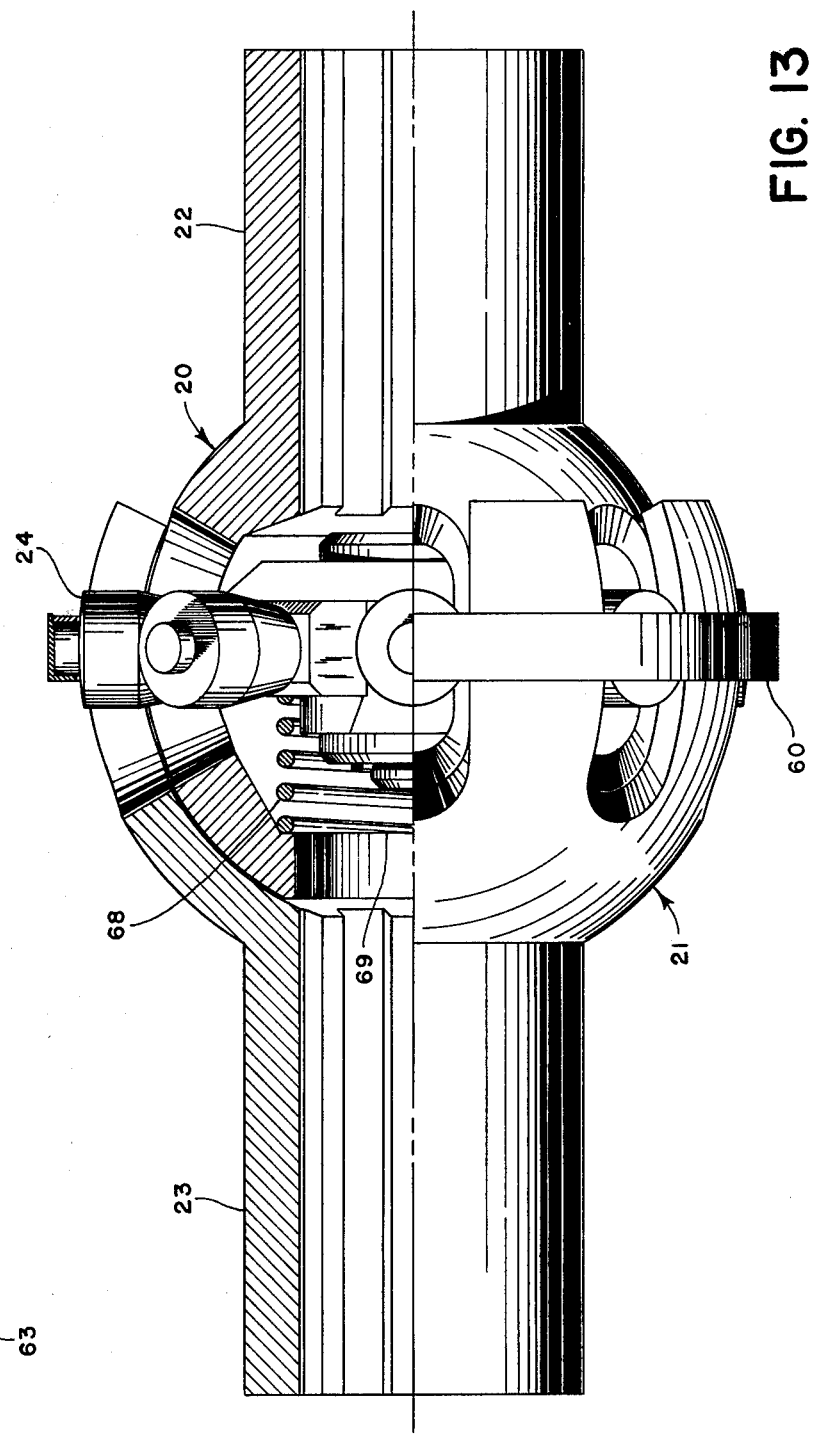

The universal joint shown in FIG. 1 can conceivably be placed in a position in which the transfer assembly is rotated out of a plane perpendicular to the input and output shafts when these shafts are coaxial. A sudden deflection of these shafts into the FIG. 12 position could then obviously generate considerable strain until the natural alignment of forces takes place which moves the transfer assembly into the bisector plane. To inhibit this possibility, the compression spring 68 may be interposed between an appropriate shelf 69 on the inside of the inner spherical member, and adapted to bear lightly on the transfer assembly 24. The spring 68 should be designed so that its free height is very slightly in excess of the normally available space between the transfer assembly and the shelf 69 to avoid the application of continuing substantial force, which would generate a binding action between the transfer assembly and the inner and outer channels. Any tendency for the transfer assembly to tip with respect to the axis of the inner spherical member shaft connection 22 would, however, be resisted by the spring 68, which would tend to restore the transfer assembly to the FIG. 13 position. The force deflecting the spring when the input and output shafts are in angular relationship would be contributed by the confinement of the rollers in the spaces defined by the intersecting channels, as previously described. This same effect can be provided by a "snake" spring having its opposite ends anchored in one or both of the spherical members, and traversing a central hole in the pin 31. The tendency of such a spring to return to straightness establishes a biasing action aligning the transfer assembly with the bisector plane.

It is often desirable to incorporate some sort of housing on the assembly to minimize the possibility of ingress of foreign material, and this function can be combined with that of the retaining ring assembly 60 by the structure shown in FIG. 12. The shell sections 70 and 71 are formed with spherical surfaces, and are assembled to the unit from axially opposite directions. The interengaged edges shown at 72 are in a plane passing through the center of the assembly. Once in position, the shell sections 70 and 71 can be retained by staking operations at 73 and 74. The shell sections 70 and 71 perform the same function as the retaining ring 60, in addition to acting as a protective housing.

I claim:

1. A universal joint, comprising:
   an outer hollow spherical member having means for receiving a first shaft, and having a plurality of peripherally-spaced channels each having an axis disposed substantially in a plane containing the axis of said first shaft;
   an inner hollow spherical member receivable within said outer spherical member opening to a position of concentricity, and having means for receiving a second shaft, the axis of said second shaft normally traversing said outer spherical member opening, and
   said inner spherical member having a plurality of channels each having an axis disposed substantially in a plane containing the axis of said second shaft; and
   a transfer assembly including a plurality of angularly spaced components traversing aligned portions of channels in said inner and outer spherical members, respectively, for transfer of forces peripherally between walls defining said channels, said transfer assembly components being secured with respect to each other with freedom for relative angular articulation in substantially coplanar relationship.

2. A universal joint as defined in claim 1, wherein said transfer assembly includes at least three diametral components, and traverses channels on opposite sides of said spherical members, respectively.

3. A universal joint as defined in claim 1, additionally including spring means operative to bias said transfer assembly toward perpendicularity with the axis of at least one of said first and second shaft axes.

4. A universal joint as defined in claim 1, wherein said outer spherical member embraces more than half of the spherical surface defining said inner spherical member, and said outer spherical member channels extend to the opening therein, and the portions of said inner spherical member between the channels thereof are axially receivable within the channels of said outer spherical member.

* * * * *